United States Patent [19]

Röhm

[11] Patent Number: 4,836,563
[45] Date of Patent: Jun. 6, 1989

[54] SELFTIGHTENING DRILL CHUCK

[76] Inventor: Günter H. Röhm, Heinrich-Röhm-Strasse 50, D-7927 Sontheim, Fed. Rep. of Germany

[21] Appl. No.: 194,411

[22] Filed: May 13, 1988

[30] Foreign Application Priority Data

Aug. 14, 1987 [DE] Fed. Rep. of Germany ....... 3727147
Mar. 8, 1988 [EP] European Pat. Off. ........ 88103566.1

[51] Int. Cl.$^4$ .............................................. B23B 31/12
[52] U.S. Cl. ..................... 279/63; 279/1 K; 279/1 ME; 279/19.3; 279/60
[58] Field of Search ............. 279/1 K, 1 ME, 60–65, 279/59, 19, 19.3, 19.4, 19.5

[56] References Cited

U.S. PATENT DOCUMENTS

| | | | |
|---|---|---|---|
| 1,668,317 | 5/1928 | Hubbell | 279/63 |
| 3,949,998 | 4/1976 | Dietzen et al. | 279/62 |
| 4,213,623 | 7/1980 | Röhm | 279/60 X |
| 4,230,327 | 10/1980 | Röhm | 279/60 X |
| 4,583,751 | 4/1986 | Röhm | 279/1 K |
| 4,700,956 | 10/1987 | Röhm | 279/62 X |

FOREIGN PATENT DOCUMENTS 3432918 3/1986 Fed. Rep. of Germany .
1566855 5/1980 United Kingdom ................. 279/60

Primary Examiner—Joseph H. McGlynn
Assistant Examiner—Steven C. Bishop
Attorney, Agent, or Firm—Herbert Dubno

[57] ABSTRACT

A selftightening drill chuck has a chuck body having a chuck thread, a chuck sleeve, a plurality of clamp jaws which are guided slidably in the chuck sleeve inclined to the chuck axis and a locking ring on the chuck body which is rotatable between two rotational end positions and is axially slidable and is coupable in the circumferential direction with the clamping sleeve by two tooth rings. The chuck body has a conical surface extending parallel to the feed direction of the clamp jaws on which the chuck thread is located which engages with a transverse gear on each clamp jaw. A spring acts on the locking ring in a rotational direction which corresponds to the opening of the drill chuck. To limit rotation of the locking ring a stop pin fixed on the chuck body can be provided which engages in a cavity of the locking ring.

20 Claims, 5 Drawing Sheets

SELFTIGHTENING DRILL CHUCK

FIELD OF THE INVENTION

My invention relates to a drill chuck and, more particularly, to a selftightening drill chuck.

Specifically, the invention deals with a selftightening drill chuck comprising a chuck body having a chuck thread forming a socket or receptacle for a drill spindle. A chuck sleeve is guided rotatably on the chuck body. A plurality of clamp jaws are supported axially in the chuck body which are guided slidably inclined to a chuck axis in the chuck sleeve and form between themselves a clamping opening coaxial with the chuck axis so that the clamp jaws move radially toward the chuck axis during adjustment of the clamp jaws and change the diameter of the clamping opening. A locking ring on the chuck body is rotatable against a spring force between two rotational end positions in a circumferential direction and is axially slidable and couplable in the circumferential direction by two tooth rings which are engaged in the axial end position corresponding to the coupled state.

BACKGROUND OF THE INVENTION

A selftightening drill chuck of this type has been described for example in German Open Patent Application No. 34 32 918. It allows both tightening of the chuck manually with the help of a chuck sleeve and selftightening of the chuck on a drill by the moment of reaction of the tool when the torque resistance of the tool causes a tightening motion on the chuck thread by the clamp jaws in the same way as the chuck sleeve.

Moreover in the known drill chuck the clamp jaws are supported or braced in the axial direction nonrotatably in a rotatable thrust piece mounted on the chuck body and the chuck sleeve is guided slidably axially on a chuck thread. The locking ring engaged on the chuck sleeve acts on the one hand to limit selftightening. The drill chuck because of the locking ring is not tightened so much during a drilling operation that it can no longer be loosened by hand. On the other hand the locking ring with the help of a spring force which acts on it in the rotational direction of the chuck sleeve corresponding to closing the drill chuck holds the clamp jaws by the chuck sleeve in a fixed unit on the tool shaft until the selftightening limit applies.

To maintain the engagement of the axially slidable chuck sleeve on the locking ring, a rotatable and axially unslidable coupling sleeve guided on the chuck body which on one side is couplable directly with the locking ring by a gear ring and on the other side is attached axially slidably and nonrotatably with the chuck sleeve. The locking ring is acted on by two compression springs, of which one is oriented in the axial direction between the locking ring and a circular shoulder of the drive spindle and the other is positioned in the circumferential direction between the locking ring and the chuck body in a groove extending over an arc segment in the locking ring. In toto this results in a comparatively expensive chuck structure.

Further a selftightening drill chuck without a selftightening or after-tightening limit is known in which the chuck body has a conical surface extending with straight outer surfaces parallel to the feed direction of the clamp jaws. A chuck thread in the form of a trapezoidal thread is located on this conical surface which engages with a transverse gear on each clamp jaw, which runs parallel to the feed direction of the clamp jaw. The chuck sleeve is held fixed from axial sliding on a circular collar of the chuck body by a roller body in its axial rear portion. The clamp jaws comprising essentially cylindrical bolts move or run in blind holes in the chuck sleeve in its rear sleeve portion. These blind holes must thus be drilled from the front in the chuck sleeve. They are located on a correspondingly small pitch circle because of their path inclined to the chuck axis and overlap mutually so that they can be made only with reduced precision. Not only the chuck precision but also the selftightening action of this known drill chuck is poor.

OBJECTS OF THE INVENTION

It is an object of my invention to provide an improved drill chuck which minimizes or does not have the above mentioned disadvantages and difficulties.

It is another object of my invention to provide a drill chuck which is selftightening or after-tightening and is free from the above mentioned disadvantages and difficulties.

It is an additional object of my invention to provide a selftightening drill chuck which is substantially simpler in operation having fewer components while providing a higher clamping precision and a tighter selftightening than the selftightening drill chuck which has been known up to now.

It is yet another object of my invention to provide a selftightening drill chuck which is particularly economical having fewer parts than the drill chuck known up to now while providing a higher clamping or chuck precision and a tighter selftightening.

SUMMARY OF THE INVENTION

These objects and others which will become more readily apparent hereinafter are attained in accordance with my invention in a selftightening drill chuck comprising a chuck body having a chuck thread forming a socket or receptacle for a drill spindle, a chuck sleeve guided rotatably on the chuck body, a plurality of clamp jaws supported axially in the chuck body which are guided slidably inclined to a chuck axis in the chuck sleeve and form between themselves a clamping opening coaxial with the chuck axis so that the clamp jaws move radially toward the chuck axis during the adjustment of the clamp jaws and change the diameter of the clamping opening, and a locking ring which is rotatable on the chuck body against a spring force between two rotational end positions in a circumferential direction and is axially slidable and couplable in the circumferential direction by two tooth rings which are engaged in the axial end position corresponding to a coupled state.

According to my invention the chuck body has a conical surface having straight-line generatrices parallel to the feed direction of the clamp jaws and the conical surface on which the chuck thread is located. The chuck thread is engaged with a transverse set of thread-engaging teeth on each of the clamp jaws. The transverse set of thread-engaging teeth extend parallel to the feed direction of the clamp jaw whereby the sides of the thread flight or spiral facing the clamping opening and the teeth sides of the transverse set of thread-engaging teeth contacting the sides of the thread flight are oriented substantially perpendicularly to the feed direction of the clamp jaw. The clamp jaw formed by a portion of a substantially cylindrical bolt acting as a guide running in the feed passage in the chuck sleeve which is fixed from axial sliding in the chuck body. The feed passages open on the rear facing surface of the chuck sleeve; their openings are covered by the locking ring. The spring force acts on the locking ring in a rotational direction corresponding to opening the drill chuck.

This drill chuck comprises only a comparatively few parts and can thus be made and assembled more economically than those selftightening drill chucks known up to now. The clamp jaws are supported directly on the chuck body on a chuck thread. The support of the clamp jaws on the thread sides substantially perpendicular to their feed direction permits the development of no force components pressing the clamp jaws against the chuck sleeve transversely to their feed direction so that the friction forces acting against moving the clamp jaws, especially on selftightening, are reduced. That results in an optimum selftightening or after-tightening action.

Since the feed passages at the rear end of the chuck sleeve are open the clamp jaws can be inserted therethrough into the chuck sleeve. There they are spaced from each other on a larger pitch circle and can be made with a very high precision which results in a correspondingly good clamping precision.

Since the chuck sleeve is not axially slidable on the chuck body, it can be directly coupled by the tooth rings with the locking ring. The spring force is provided in a rotational direction which returns the locking ring to its initial position for each new clamping of a tool. From its initial position it can be rotated relative to the chuck body in the closing direction of the chuck sleeve until it reaches the selftightening limit.

Advantageously, the end of the chuck body facing the clamping opening is formed by a guide pin coaxial with the chuck axis which connects to the narrow end of a conical surface of the chuck body by a radially outwardly directed ring surface and the chuck sleeve is guided on the peripheral surface of the guide pin with a radially inwardly directed ring shoulder.

As a result the guiding of the chuck sleeve occurs axially on both sides of the conical surface on the chuck body with an advantageously high guiding precision.

Further the guide pin's diameter should be chosen so that the chuck sleeve has completely circumferentially closed feed passages for the clamp jaws in the vicinity of the ring shoulder. This results in a satisfactory guiding of the clamp jaws with small chuck diameter and high clamping precision as well as a high guide precision of the chuck sleeve.

Because of the surprisingly strong selftightening or after-tightening of the drill chuck according to my invention, a roll body support or bracing of the chuck sleeve and chuck body can be abandoned. In one simple embodiment the chuck sleeve and the chuck body are retained on each other by a spring ring which engages in circular grooves positioned opposite each other in the chuck body and the clamping sleeve and is formed like a plate spring so that it presses the chuck sleeve forward axially relative to the chuck body, also in the direction of the tool.

During the selftightening this spring ring loses its axial spring action, since it is deformed to a rigid state in the circular grooves in the chuck body and the chuck sleeve. If however the chuck body operates in a rotational direction of the drill chuck corresponding to its opening, e.g. like a screw driver on unscrewing a screw, the spring ring results in an elastic clamping of the chuck sleeve to the chuck body so that an unintended loosening of the drill chuck can be countered.

Another particularly desirable embodiment which is especially easy to make and to assemble has the chuck sleeve formed on its end facing the locking ring with a divided ring which engages with its radially interior edge in a circular groove of the chuck body and on its radially exterior edge forms one of the tooth rings associated with the chuck sleeve.

This divided ring can be formed by platelike ring segments which are attached detachably to the circular facing surface forming the end of the chuck sleeve, particularly with screws. Advantageously the divided ring and especially the ring segments can be provided more simply with the gear ring associated with the chuck sleeve than directly with the chuck sleeve.

Appropriately the chuck body can carry a radially projecting stop pin for limiting rotation of the locking ring which engages in a cavity of the locking ring open to the chuck body and the chuck sleeve which is larger circumferentially than the thickness of the stop pin and whose sides form contacting or stop surfaces circumferentially for the stop pin. The circumferential free play of the stop pin in the cavity determines the extent of the rotation by which the chuck sleeve can rotate for selftightening until it reaches the limit for selftightening.

When the cavity is open to the chuck sleeve, the locking ring can be pushed from this rear end on assembly axially over the chuck body until the contacting pin enters the cavity. Besides the cavity is understandably so large in the axial direction that the locking ring can be shifted between both axial end positions. Without that the stop pin would leave the cavity. The locking ring has a gear ring associated with it radially exterior to the cavity.

In one other very advantageous form of my invention which is substantially more load resistant than the above mentioned embodiments for limiting rotation of the locking ring at least one peripheral surface of the chuck body has a planar secant surface. Two opposing planar stop surfaces are provided on the inside peripheral surfaces of the locking ring. These contacting or stop surfaces bounding each other have a common edge parallel to the chuck axis and this edge acts as an axis about which the stop surfaces are inclined at a predetermined angle which corresponds to the maximum possible pivot angle of the locking ring. In both rotational end positions of the locking ring limiting its rotation the secant surface contacts one or the other of the two opposing stop surfaces which results in a reduced specific force load on these surfaces.

This further allows the improvement that the secant surface and the stop surfaces are provided pairwise diametrically opposing each other on the locking ring or the chuck body. A free space arises between the secant surface and the contacting surfaces lying opposite it. This free space should be connected to a radially directed cleaning duct guided to the exterior through the wall of the locking ring so that drilling waste and other impurities do not collect in the free space and reduce the rotation angle and impair the selftightening.

For providing the spring force acting in the circumferential direction a coil spring can be provided which is positioned in a spring space between the chuck body and the locking ring and whose ends are braced circumferentially on one side on the chuck body and on the other side on the locking ring. The coil spring can also keep the locking ring in its axial end position corresponding to a coupled or engaged state. The coil spring is braced at one end on the locking ring and at the other end on the chuck body to provide the axial spring force. Thus one single coil spring suffices to return the locking ring into the initial state and to keep it coupled to the chuck sleeve.

According to another very advantageous feature a locking mechanism keeping the locking ring in its axial end positions corresponding to the decoupled state is provided which prevents rotation of the locking ring. That has the advantage that the locking ring can be held fixed in the uncoupled state and because of that is completely easily manipulated. In particular it is very desirable for the locking mechanism to have at least one radial lock tongue projecting against the chuck body on the locking ring which is elastically deformable in the axial direction and according to the axial end position of the locking ring engages in one of two lock grooves provided parallel with each other on the chuck body in which the lock tongue is slidable in the circumferential direction.

Appropriately a plurality of lock tongues distributed circumferentially over the circumference of the locking ring are provided and the lock grooves can be substantially circular or ring shape. Also the lock tongues can border on the gear ring of the locking ring with their tongue heel. This allows the lock tongues radially to project free with a larger length facilitating their elastic deformation while simultaneously reducing the axial length of the locking ring.

The guiding of the locking ring can be improved when the locking ring has a collar bounding one gear ring which overlaps the other gear ring and the openings of the feed passages for the clamp jaws on the chuck sleeve and is guided on the circumferential surface of the chuck sleeve.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 2:
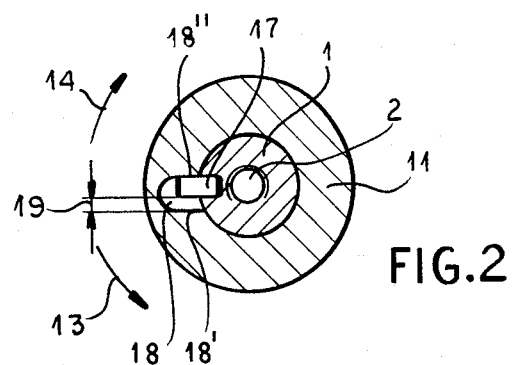
FIG. 2 is a cross sectional view of the drill chuck taken along the section line II—II of FIG. 1.
Figure 1:
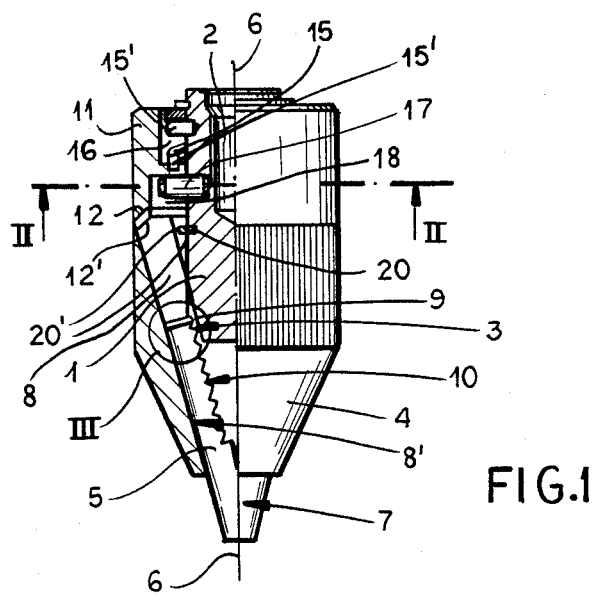
FIG. 1 is a partially side elevational, partially axial cross sectional view of one embodiment of a drill chuck according to my invention.
Figure 3:
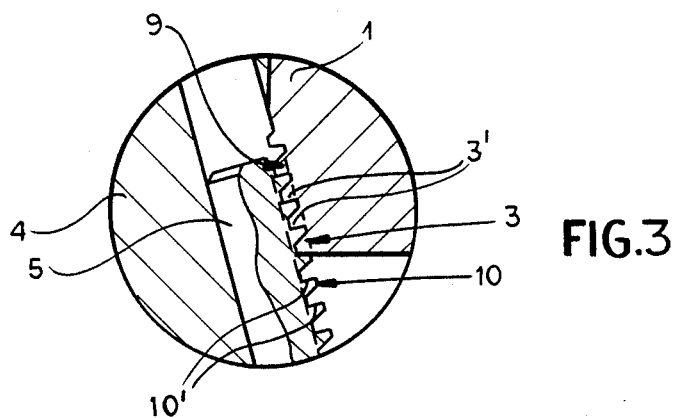
FIG. 3 is an enlarged cross sectional view of the portion III of FIG. 1.
Figure 5:
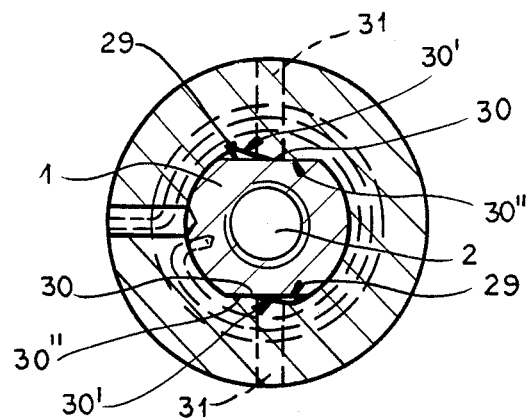
FIG. 5 is a cross sectional view of the drill chuck taken along the section line V—V in FIG. 4.
Figure 4:
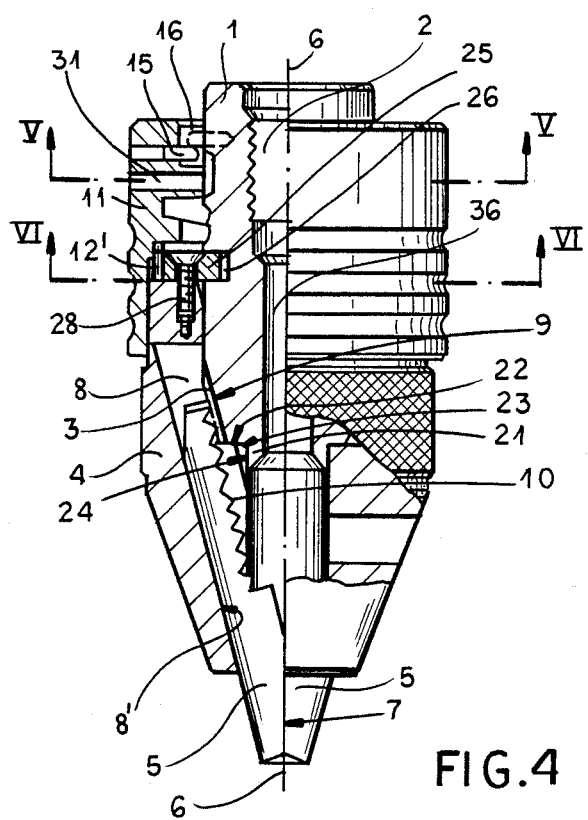
FIG. 4 is a partially side elevational, partially axial cross sectional view of another embodiment of a drill chuck according to my invention similar to FIG. 1.
Figure 6:
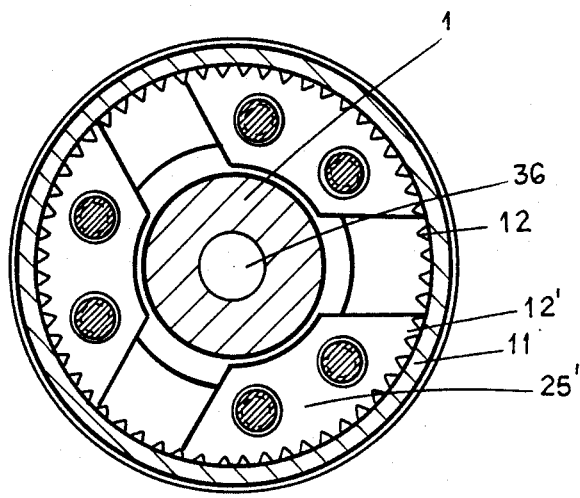
FIG. 6 is a cross sectional view of the drill chuck taken along the section line VI—VI of FIG. 4.
Figure 7:
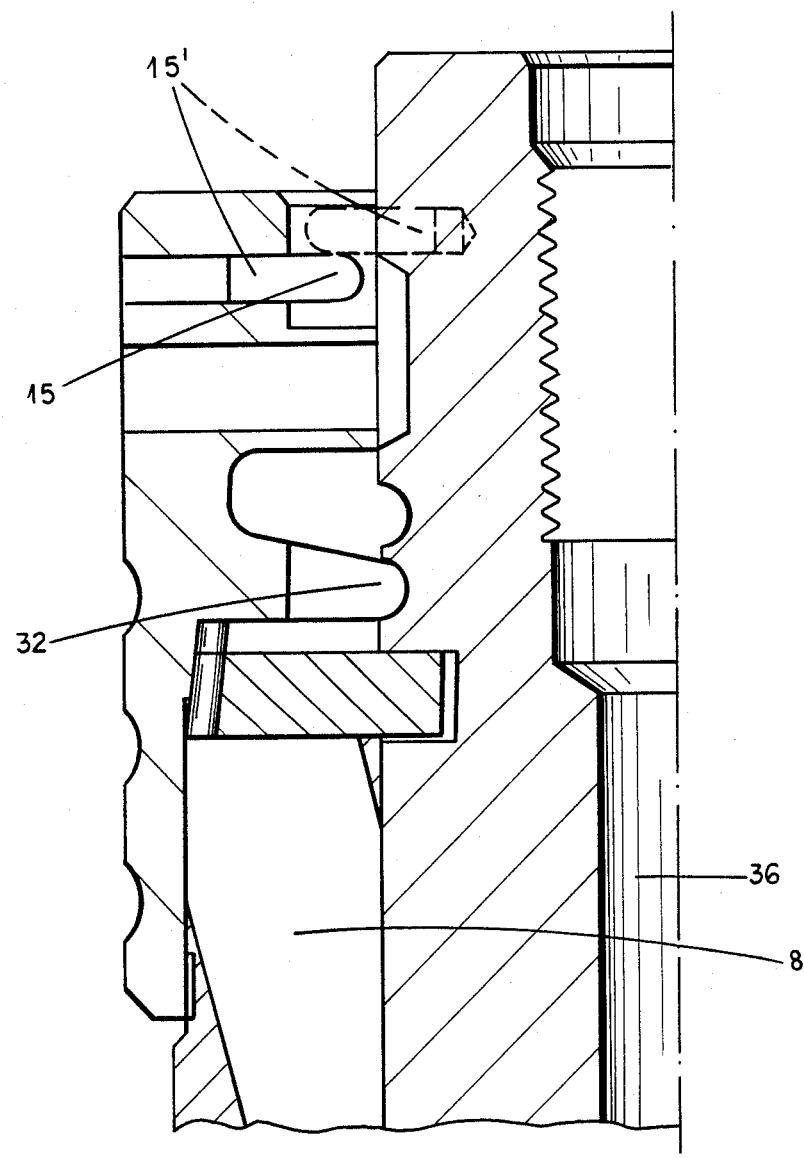
FIG. 7 is a magnified cross sectional view of the left half of the drill chuck shown in FIG. 4.
Figure 8:
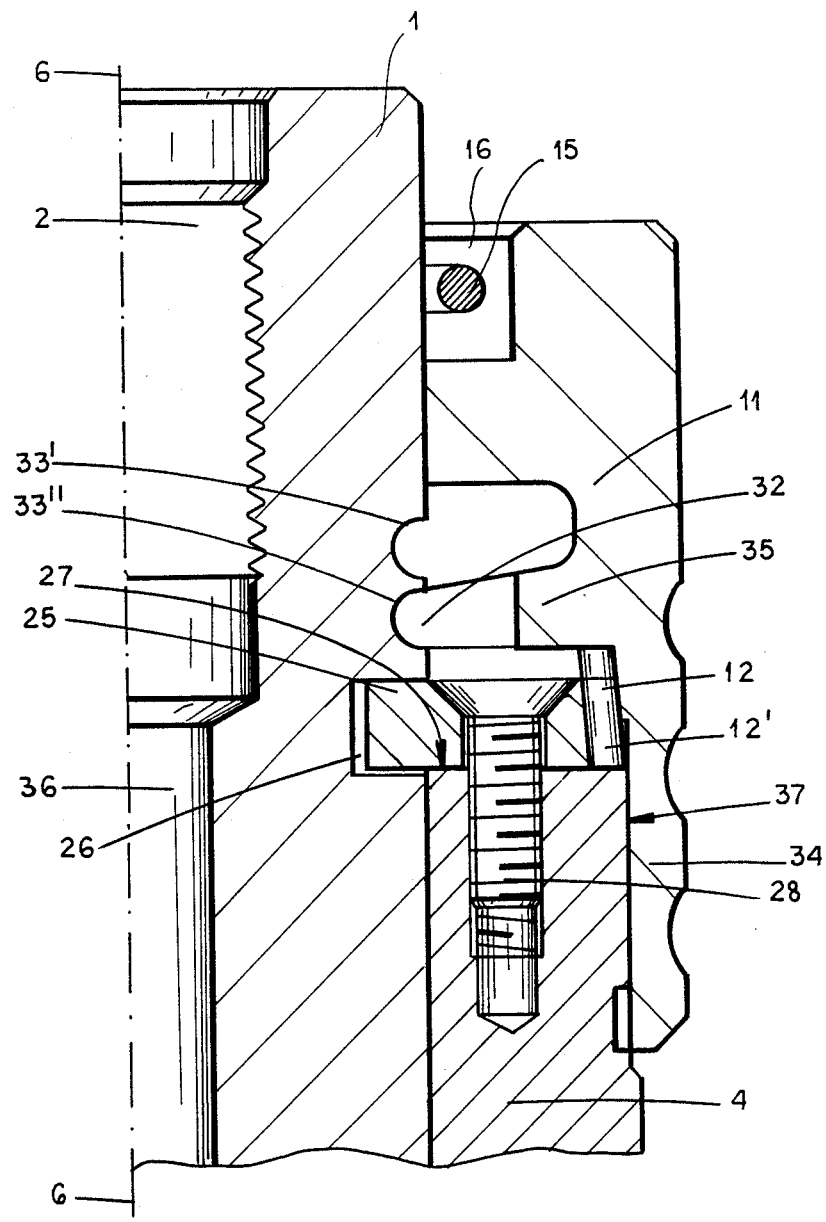
FIG. 8 is an enlarged portion of the right half of the drill chuck according to FIG. 4.

The chuck body 1 of the selftightening drill chuck shown in FIGS. 1 to 3 forms a receptacle or socket 2 for an unshown drill spindle and has a chuck thread 3 which guide the motion of the chuck jaws 5 supported axially on the chuck thread 3 on rotation of an axially unslidable chuck sleeve 4 guided on the chuck body 1.

These chuck jaws 5 form a clamping opening 7 for the tool shaft shown completely closed in the drawing which is coaxial with the chuck axis 6 and are guided in the chuck sleeve 4 inclined to the chuck axis 6 in the feed passage 8 and/or in the groove 8' open to the chuck body 1 and to the chuck thread 3.

As a result of this inclined feed the clamp jaws 5 can be adjusted on sliding thus radially to the chuck axis 6 and change the diameter of the clamping opening 7.

The chuck thread 3 is located on a conical surface 9 of the chuck body 1 which extends with its straight outer surface parallel to the feed direction of the clamp jaws 5. The chuck thread 3 is engaged with a transverse set of thread-engaging teeth 10 on each clamp jaw 5 which extend on the clamp jaw parallel to its feed direction.

Furthermore a locking ring 11 is provided which is both rotatable and axially slidable in the chuck body 1 between two rotational end positions against a spring force.

The locking ring 11 can be peripherally connected with the chuck sleeve 4 by two tooth rings 12, 12' which are engaged with each other in the forward axial end position of the locking ring 11 shown in the drawing. The spring force acts on the locking ring 11 in the rotational direction of the chuck sleeve 4 indicated by the arrow 13 in FIG. 2 corresponding to opening the drill chuck, which has the result that the locking ring 11 is located in that rotational position in the state uncoupled from the chuck sleeve 4 from which it can be rotated into its other rotational end position by rotation in the rotational direction of the chuck sleeve indicated by the arrow 14.

A single axial coil spring 15 acting in the peripheral direction provides the spring force. It is located in the spring space 16 between the chuck body 1 and the locking ring 11. Its ends 15' are braced or supported both axially and also in the circumferential direction on one end on the chuck body 1 and on the other end on the locking ring 11. These ends 15' are axially and radially bent and substantially are force fitted in holes in the chuck body 1 and/or in the locking ring 11.

As indicated in FIG. 3 the sides 3' of the thread flight of the chuck thread 3 facing the clamping opening 7 and the tooth sides 10' of the transverse thread-engaging teeth 10 of the clamp jaws 5 coming into contact with them are oriented substantially perpendicularly to the feed direction of the clamp jaws 5.

The axial support of the clamp jaws 5 on these thread sides 3', 10' can not lead to compensating or balancing forces which press the clamp jaws 5 transversely to their feed direction against the chuck sleeve 4 and thus cause an increased friction of the clamp jaws 5 on the chuck sleeve 4. The clamp jaws themselves are substantially cylindrical bolts in part guided in the feed passages 8. The feed passages 8 are made open to the rear facing surfaces of the chuck sleeve 4 and can be made with a high precision or accuracy in the chuck sleeve 4. The locking ring 11 covers the opening of the feed passages 8.

To bound or limit the rotation of the locking ring 11, the chuck body 1 carries a radially protruding stop pin 17 which engages in a cavity 18 of the locking ring 11 open to the chuck body 1 and the chuck sleeve 4. The cavity 18 is greater than the thickness of the stop pin 17 in the peripheral direction about the selftightening path.

Its sides 18', 18" form stop surfaces for the stop pin 17 which fix both end positions for the locking ring 11.

Outside of the cavity 18 the locking ring 11 carries on its edge facing the clamping sleeve 4 one gear ring 12 of the pair of tooth rings 12, 12'. The other gear ring 12' is located directly opposite on the edge of the clamping sleeve 4. The cavity 18 is so deep axially that on axially shifting the locking ring 11 between both axial end positions the stop pin 17 can not leave the cavity 18 and the axial sliding can not be prevented.

The chuck sleeve 4 and the chuck body 1 are held in each other by a spring ring 20 which engages in opposing circular grooves 20' in the chuck body 1 and the chuck sleeve 4. It is formed like a plate spring so that it can press the chuck sleeve 4 axially forward relative to the chuck body 1.

Under the action of the axial forces occurring on selftightening between the chuck sleeve 4 and the chuck body 1 the chuck sleeve 4 is pressed back axially relative to the chuck body 1 during a deformation of the spring ring 20 so far that the spring ring 20 loses its spring action.

On selftightening, this spring ring 20 is ineffective. If the drill chuck is operated in a rotational direction corresponding to its opening, for example for rotating out screws or the like, the spring ring 20 can lead to an axial clamping between the chuck sleeve 4 and the chuck body 1 with the drill chuck closed which acts to counter an undesirable opening of the drill chuck.

The engagement of the tooth rings 12, 12' can be so designed that the locking ring 11 can be automatically pushed out from coupling engagement on the chuck sleeve 4 tooth by tooth when the chuck sleeve 4 is rotated by hand and thus the locking ring 11 is held fixed by contact on the stop pin 17 in the one or the other end position. On the other hand the coupling engagement must be strong enough so that an automatic opposing rotation of the locking ring 11 and the chuck sleeve 4 is prevented in the drilling operation.

By choice of the axial force of the coil spring 15 and the shape of the tooth sides on the tooth rings 12, 12' the coupling conditions between the locking ring 11 and the chuck sleeve 4 can be further adjusted according to the requirements.

It is also possible to design the coupling engagement so that in each case when the coupling is to be opened it is necessary to slide back the locking ring 11 manually axially against the force of the coil spring 15. Thus the coil spring 15 with its force acting circumferentially causes a rotation of the locking ring 11 into its initial position corresponding to the open chuck in which the stop pin contacts on the side 18' of the cavity 18.

After each new clamping of a tool the locking ring 11 can again be rotated in a rotational direction corresponding to the closing of the drill chuck until it contacts on the other side 18" of the cavity 18, also until it limits the selftightening and prevents additional selftightening rotation by engagement in the chuck sleeve 4.

Thus the force of the coil spring 15 directed opposite to this rotation of the chuck sleeve 4 is understandably reduced so that it can not prevent rotation of the locking ring 11 relative to the chuck body 1 taking place on selftightening.

In the embodiment according to FIGS. 4 to 8 parts corresponding to ones in the first embodiment are provided with the same reference character so that a repeat description in regard to those parts would apply. Otherwise the description is as follows: the coil spring 15 acting only in a circumferential or peripheral direction does not hold the locking ring 11 axially in the coupled or engaged state in the chuck sleeve 4. A lock mechanism formed by at least one lock tongue 32 and lock grooves 33', 33" acts to keep the locking ring 11 in the disengaged or uncoupled state.

The lock tongues 32 are distributed uniformly over the circumference of the locking ring 11 and engage in the lock grooves 33' or 33" which are essentially parallel and circular or ring shape. The lock tongues 32 on the locking ring 11 project radially against the chuck body 1 on which the lock grooves are found.

The locking tongues 32 are deformed elastically in the axial direction and lock into one or both the lock grooves 33', 33" according to the axial end position of the locking ring 11 in which they are slidable freely in the circumferential direction so that the lock mechanism does not prevent the rotation of the locking ring 11 on the chuck body 1 and of course in the coupled and uncoupled state of the locking ring.

The lock tongues 32 with the tongue heel 35 border on the gear ring 12 of the locking ring 11 so that the lock tongues 32 without taking up a large axial height on the locking ring 11 can have a large radial extension and thus good mobility in the axial direction.

Further for rotationally limiting the motion of the locking ring 11 the peripheral surfaces of the chuck body 1 are provided with two secant surfaces 29 positioned diametrically opposite each other. Two planar contacting surfaces 30', 30" are provided on the inside peripheral surfaces of the locking ring 11 opposing the secant surfaces 29. They border on each other on at a common edge 30 parallel to the chuck axis 6 and are inclined about this edge 30 which serves as an axis and of course at an angle which is the maximum angle of rotation for the locking ring 11.

The free space between the secant surface 29 and the two contacting surfaces 30', 30" is connected to cleaning ducts 31 leading radially through the wall of the locking ring 11 to the surroundings.

Instead of the spring ring 20 the chuck sleeve 4 carries a multiply divided ring 25 on its end facing the locking ring 11. It engages with its radial inner edge in a circular groove 26 of the chuck body 1 and forms the gear ring 12' oriented toward the chuck sleeve 4 on its radial outer edge. The ring 25 is formed by platelike ring segments 25' which are attached detachably with screws 28 on the circular facing surface 27 forming the one end of the clamping sleeve 4. For mounting of the chuck the clamping sleeve 4 is pushed axially from the front by the chuck body 1 and after adjusting the clamp jaws 5, when it has engaged in the chuck thread 3, is attached to the ring segments 25' inserted in the circular groove 26.

Besides the chuck sleeve 4 is axially guided by the conical surface 9 and the chuck thread 3. Moreover the chuck body 1 is provided on its end facing the clamping opening 7 with a guide pin 21 which connects to the narrow end of a conical surface 9 by a radially outwardly directed ring surface 22.

The chuck sleeve 4 is guided on the peripheral surface of the guide pin 21 with a ring shoulder 23 directed inwardly radially. Thus the guide pin 21 is chosen having a diameter which is small enough so that the feed passages 8 for the clamp jaws 5 in the chuck sleeve 4 in the vicinity of the ring shoulder 23 are completely closed circumferentially. On the other hand the diameter of the guide pin 21 is large enough to accommodate a central hole 36 of the chuck body 1 which connects the clamping opening 7 with the cavity 2 and through which a hammering action from a riveting die guided movably in the central hole 36 communicated by the drill spindle can be directly transmitted to a drill tool guided between the clamp jaws 5.

Finally the locking ring 11 has a shoulder 34 bordering on its gear ring 12 which axially overlaps the gear ring 12' and the openings of the feed passages 8 in the chuck sleeve 4 and is additionally guided on the circumferential surface 37 of the chuck sleeve 11.

By the "front" of chuck body 1 or the drill chuck I mean that end which receives the tool held by the drill chuck.

I claim:

1. In a selftightening drill chuck comprising a chuck body having a chuck thread forming a socket or receptacle for a drill spindle, a chuck sleeve guided rotatably on said chuck body, further a plurality of clamp jaws supported axially in said chuck body which are guided slidably inclined to a chuck axis in said chuck sleeve and form between themselves a clamping opening coaxial with said chuck axis so that said clamp jaws move radially toward said chuck axis during the adjustment of said clamp jaws and change the diameter of said clamping opening, a locking ring which is rotatable on said chuck body against a spring force between two rotational end positions in a circumferential direction and is axially slidable and couplable in said circumferential direction by two tooth rings which are engaged in, an axial end position corresponding to a coupled state, the improvement wherein said chuck body has a conical surface with straightline generatrices on which said chuck thread is located parallel to the feed direction of said clamp jaws, said chuck thread being engaged with a transverse set of thread-engaging teeth on each of said clamp jaws, said transverse set of thread-engaging teeth extending parallel to said feed direction of said clamp jaw, the sides of a thread flight of said chuck thread facing said clamping opening and the teeth sides of said transverse set of said thread-engaging teeth contacting said sides of said thread flight being oriented substantially perpendicularly to said feed direction of said clamp jaw, each of said clamp jaws being formed with a portion of a substantially cylindrical bolt acting as a guide running in a feed passage in said chuck sleeve fixed from axial sliding on said chuck body, said feed passages opening on the rear facing surface of said chuck sleeve and being covered by said locking ring and said spring force acting on said locking ring in a rotational direction corresponding to opening of said drill chuck.

2. The improvement defined in claim 1 wherein the end of said chuck body facing said clamping opening is formed by a guide pin coaxial with said chuck axis which is connected to the narrow end of said conical surface of said chuck body by a radially outwardly directed ring surface and said chuck sleeve is guided with a radially inwardly directed ring shoulder on the peripheral surface of said guide pin.

3. The improvement defined in claim 2 wherein said chuck sleeve has said feed passages for said clamp jaws completely circumferentially closed in the vicinity of said ring shoulder.

4. The improvement defined in claim 1 wherein said chuck sleeve and said chuck body are held on each other by a spring ring which engages in circular grooves on said chuck body and said chuck sleeve positioned opposite each other and is formed like a plate spring so that said spring ring presses said chuck sleeve axially to the front relative to said chuck body.

5. The improvement defined in claim 1 wherein said chuck sleeve carries a divided ring on the end of said chuck sleeve facing said locking ring which engages with a radial inner edge in a circular groove of said chuck body and with a radial outer edge forms one of said tooth rings facing said chuck sleeve.

6. The improvement defined in claim 5 wherein said divided ring is formed by a plurality of plate like ring segments which are attached to the circular facing surface forming one end of said clamping sleeve.

7. The improvement defined in claim 6 wherein said ring segments are attached with a plurality of screws detachably to said facing surface.

8. The improvement defined in claim 1 wherein for limiting the rotation of said locking ring said chuck body carries a stop pin protruding radially which engages in a cavity of said locking ring open to said chuck sleeve and said chuck body, which is larger in said circumferential direction than the thickness of said stop pin and whose ends form stop surfaces for said stop pin in said circumferential direction and said locking ring has one of said tooth rings associated radially exterior to said cavity.

9. The improvement defined in claim 1 wherein for limiting the rotation of said locking ring at least one peripheral surface of said chuck body is provided with a planar secant surface and two opposing planar stop surfaces are provided on the opposing inside peripheral surfaces of said locking ring, said two planar stop surfaces bounding each other at a common edge parallel to said chuck axis and are inclined to each other at an angle about said axis which corresponds to the maximum possible pivot angle for said locking ring.

10. The improvement defined in claim 9 wherein two of said secant surfaces and associated ones of said opposing stop surfaces are provided diametrically opposing each other on said locking ring or said chuck body.

11. The improvement defined in claim 9 wherein the space between said secant surface and said stop surfaces positioned opposite said secant surface is connected to at least one cleaning duct leading exteriorly through the wall of said locking ring.

12. The improvement defined in claim 1 wherein for providing said spring force acting in said circumferential direction a coil spring is provided which is positioned in a spring space between said chuck body and said locking ring and whose ends are supported on one side in said circumferential direction on said chuck body and on the other side on said locking ring.

13. The improvement defined in claim 12 wherein said coil spring retains said locking ring in said axial end position corresponding to said coupled state, said coil spring being supported to provide said spring force acting axially on said chuck body at one end and on said locking ring on the other end.

14. The improvement defined in claim 1 wherein a locking mechanism retaining said locking ring in said coupled or an uncoupled state corresponding to one of said axial end positions is provided which does not hinder the rotation of said locking ring.

15. The improvement defined in claim 14 wherein said locking mechanism has at least one radially projecting lock tongue on said locking ring directed toward said chuck body, said lock tongue is deformable elastically in the axial direction and engageable in one of two lock grooves provided parallel to each other in said chuck body, said lock tongue being slidable in said circumferential direction.

16. The improvement defined in claim 15 wherein a plurality of said lock tongues is provided distributed circumferentially around said locking ring and each of said lock grooves is substantially circular or ring shape.

17. The improvement defined in claim 15 wherein each of said lock tongues borders on one of said tooth rings of said locking ring with a tongue heel.

18. The improvement defined in claim 1 wherein said locking ring has a collar bounding on one of said tooth rings which overlaps axially the other of said tooth rings and said feed passages for said clamp jaws and is guided on the circumferential surface of said chuck sleeve.

19. A selftightening drill chuck comprising:
a chuck body having a chuck thread and forming a socket or receptacle;
a chuck sleeve guided rotatably on said chuck body;
a plurality of clamp jaws supported axially in said chuck body which are guided slidably inclined to a chuck axis of said drill chuck in said chuck sleeve and form between themselves a clamping opening coaxial with said chuck axis so that said clamp jaws move radially toward said chuck axis during the adjustment of said clamp jaws and change the diameter of said clamping opening, said chuck body having a conical surface on which said chuck thread is located having straight line generatrices parallel to the feed direction of said clamp jaws, said chuck thread being engaged with a transverse set of thread-engaging teeth on each of said clamp jaws, said transverse set of thread-engaging teeth extending parallel to said feed direction of said clamp jaw, the sides of a thread flight or spiral of said chuck thread facing said clamping opening and the teeth sides of said transverse set of said thread-engaging teeth contacting said sides of said thread flight being oriented substantially perpendicularly to said feed direction of said clamp jaw, each of said clamp jaws being formed with a portion of a substantially cylindrical bolt acting as a guide running in a feed passage completely closed circumferentially in said chuck sleeve fixed from axial sliding on said chuck body;
a locking ring on said chuck body which is rotatable against a spring force between two rotational end positions in a circumferential direction, is axially slidable and couplable in said circumferential direction by two tooth rings which are engaged in an axial end position corresponding to a coupled or engaged state, said feed passages opening on the rear facing surface of said chuck sleeve and being covered by said locking ring and said spring force acting on said locking ring in a rotational direction corresponding to opening said drill chuck;
a guide pin coaxial with said chuck axis at the end of said chuck body facing said clamping opening which is connected to the narrow end of a conical surface of said chuck body by a radially outwardly directed ring surface and said chuck sleeve is guided with a radially inwardly directed ring shoulder on the peripheral surface of said guide pin;
a spring ring holding said chuck sleeve and said chuck body in each other which simultaneously engages in a circular groove in said chuck body and a circular groove in said chuck sleeve positioned opposite each other and is formed like a plate spring so that said spring ring presses said chuck sleeve axially to the front relative to said chuck body;
a stop pin for limiting the rotation of said locking ring protruding radially from said chuck body engaged in a cavity of said locking ring open to said chuck sleeve and said chuck body, which is larger in said circumferential direction than the thickness of said stop pin and whose sides form stop surfaces for said stop pin in said circumferential direction and said locking ring has one of said tooth rings associated radially exterior to said cavity; and
a coil spring which is positioned in a spring space between said chuck body and said locking ring for providing said spring force acting in said circumferential direction and the ends of said coil spring are supported on one side in said circumferential direction on said chuck body and on the other side on said locking ring and said coil spring holds said locking ring in one of said axial end positions corresponding to said coupled or engaged state, said coil spring being supported to provide said spring force acting axially on said chuck body at one end and on said locking ring on the other end.

20. A selftightening drill chuck comprising:
a chuck body having a chuck thread forming a socket or receptacle;
a chuck sleeve guided rotatably on said chuck body;
a plurality of clamp jaws supported axially in said chuck body which are guided slidably inclined to a chuck axis in said chuck sleeve and form between themselves a clamping opening coaxial with said chuck axis so that said clamp jaws move radially toward said chuck axis during the adjustment of said clamp jaws and change the diameter of said clamping opening and said chuck sleeve having a conical surface on which said chuck thread is located having straightline generatrices parallel to the feed direction of said clamp jaws, said chuck thread being engaged with a transverse set of thread-engaging teeth on each of said clamp jaws, said transverse set of thread-engaging teeth extending parallel to said feed direction of said clamp jaw, the sides of a thread flight or spiral of said chuck thread facing said clamping opening and the teeth sides of said transverse set of said thread-engaging teeth contacting said sides of said thread flight are oriented substantially perpendicularly to said feed direction of said clamp jaw, each of said clamp jaws being formed with a portion of a substantially cylindrical bolt acting as a guide running in a feed passage in sai chuck sleeve fixed from axial sliding on said chuck body;
a locking ring which is rotatable on said chuck body against a spring force between two rotational end positions in a circumferential direction, is axially slidable and couplable in said circumferential direction by two tooth rings which are engaged in an axial end position corresponding to an engaged or coupled state and said feed passages opening on the rear facing surface of said chuck sleeve and being covered by said locking ring and said spring force acts on said locking ring in a rotational direction corresponding to opening said drill chuck;

a divided ring on the end of said chuck sleeve facing said locking ring which engages with a radial inner edge in a circular groove of said chuck body and forms one of said tooth rings facing said chuck sleeve on a radial outer edge and said divided ring being formed by a plurality of plate like ring segments which are attached to the circular facing surface forming one end of said clamping sleeve with a plurality of screws; and at least one planar secant surface for limiting the rotation of said locking ring on a peripheral surface of said chuck body and two opposing planar stop surfaces being provided on the inside peripheral surfaces of said locking ring, said two planar stop surfaces bounding each other at a common edge parallel to said chuck axis and being inclined to each other at an angle about said axis which corresponds to the maximum possible pivot angle for said locking ring and the space between said secant surface and said stop surfaces positioned opposite said secant surface being connected to at least one cleaning duct leading exteriorly through the wall of said locking ring.

* * * * *